(12) United States Patent
Webb et al.

(10) Patent No.: US 10,908,562 B2
(45) Date of Patent: Feb. 2, 2021

(54) APPARATUS AND METHOD FOR USING ADVANCED PROCESS CONTROL TO DEFINE REAL-TIME OR NEAR REAL-TIME OPERATING ENVELOPE

(71) Applicant: Honeywell International Inc., Morris Plains, NJ (US)

(72) Inventors: Christopher J. Webb, Scottsdale, AZ (US); Andrew John Trenchard, Romsey (GB); Sanjay K. Dave, Bangalore (IN); Michael Niemeic, Dexter, MI (US); Mandar Vartak, Bangalore (IN); Sriram Hallihole, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/049,978

(22) Filed: Jul. 31, 2018

(65) Prior Publication Data

US 2019/0121304 A1   Apr. 25, 2019

Related U.S. Application Data

(60) Provisional application No. 62/575,984, filed on Oct. 23, 2017.

(51) Int. Cl.
   *G05B 13/04* (2006.01)
(52) U.S. Cl.
   CPC .................. *G05B 13/041* (2013.01)
(58) Field of Classification Search
   None
   See application file for complete search history.

(56) References Cited

U.S. PATENT DOCUMENTS 5,351,184 A   9/1994 Lu et al.
5,561,599 A   10/1996 Lu
(Continued)

FOREIGN PATENT DOCUMENTS

JP   4413534 B2   2/2010
JP   2012226731 A   11/2012

OTHER PUBLICATIONS

Shafer, "Multivariable MPC system performance assessment, monitoring, and diagnosis", 2004, Journal of Process Control 14, pp. 113-129 (Year: 2004).*

(Continued)

*Primary Examiner* — Mohammad Ali
*Assistant Examiner* — David Earl Ogg
(74) *Attorney, Agent, or Firm* — Seager Tufte & Wickham LLP

(57) ABSTRACT

A method includes identifying one or more proxy limit variables to be used to define an operating envelope associated with an industrial process controller. The industrial process controller is associated with a number of process variables including the proxy limit variable(s). The method also includes maximizing and minimizing at least one of the proxy limit variable(s). The method further includes presenting maximum and minimum values of the at least one of the proxy limit variable(s) as the operating envelope in a graphical user interface to at least one user. A single proxy limit variable could be used, and maximum and minimum values of the single proxy limit variable can be presented in a one-dimensional representation of the operating envelope. Multiple proxy limit variables could also be used, and maximum and minimum values of the proxy limit variables can be presented in a multi-dimensional representation of the operating envelope.

20 Claims, 7 Drawing Sheets

(56) References Cited

U.S. PATENT DOCUMENTS

| | | | |
|---|---|---|---|
| 5,572,420 A | 11/1996 | Lu | |
| 5,574,638 A | 11/1996 | Lu | |
| 5,666,477 A | 9/1997 | Maeda | |
| 5,684,507 A | 11/1997 | Rasnake et al. | |
| 6,031,547 A | 2/2000 | Kennedy | |
| 6,055,483 A | 4/2000 | Lu | |
| 6,122,555 A | 9/2000 | Lu | |
| 6,577,323 B1 | 6/2003 | Jamieson et al. | |
| 6,993,403 B1 | 1/2006 | Dadebo et al. | |
| 7,035,704 B2 | 4/2006 | Lee | |
| 7,209,793 B2* | 4/2007 | Harmse | G05B 17/02 700/28 |
| 7,260,443 B2 | 8/2007 | Morinaga et al. | |
| 7,599,751 B2* | 10/2009 | Cutler | G05B 13/041 700/266 |
| 8,380,328 B2* | 2/2013 | Brooks | G05B 19/41875 700/33 |
| 2001/0021900 A1 | 9/2001 | Kassmann | |
| 2001/0041995 A1 | 11/2001 | Eder | |
| 2002/0072828 A1 | 6/2002 | Turner et al. | |
| 2003/0046646 A1 | 3/2003 | Amano et al. | |
| 2003/0083788 A1 | 5/2003 | Harada et al. | |
| 2003/0120361 A1 | 6/2003 | Anderson et al. | |
| 2003/0130962 A1 | 7/2003 | Komiya | |
| 2003/0208389 A1 | 11/2003 | Kurihara et al. | |
| 2004/0133616 A1 | 7/2004 | Manevitz et al. | |
| 2004/0158339 A1 | 8/2004 | Kawase et al. | |
| 2004/0267394 A1 | 12/2004 | Kempf et al. | |
| 2005/0044026 A1 | 2/2005 | Leistner | |
| 2005/0107895 A1 | 5/2005 | Pistikopoulos et al. | |
| 2005/0240382 A1 | 10/2005 | Nakaya et al. | |
| 2005/0246045 A1 | 11/2005 | Sugihara et al. | |
| 2005/0286179 A1 | 12/2005 | Huff et al. | |
| 2006/0136275 A1 | 6/2006 | Cotora | |
| 2006/0142886 A1 | 6/2006 | Ishibashi et al. | |
| 2007/0050070 A1 | 3/2007 | Strain et al. | |
| 2007/0083281 A1 | 4/2007 | Chen et al. | |
| 2007/0260335 A1 | 11/2007 | Fan et al. | |
| 2008/0071395 A1 | 3/2008 | Pachner | |
| 2008/0109329 A1 | 5/2008 | Fichtinger et al. | |
| 2008/0140439 A1 | 6/2008 | Hoffman | |
| 2008/0162671 A1* | 7/2008 | Mann | H04L 41/0813 709/220 |
| 2008/0172280 A1 | 7/2008 | Goulimis | |
| 2008/0208027 A1 | 8/2008 | Heaton | |
| 2008/0215386 A1 | 9/2008 | Eder | |
| 2008/0244449 A1 | 10/2008 | Morrison et al. | |
| 2009/0024911 A1 | 1/2009 | Margolis | |
| 2009/0043546 A1 | 2/2009 | Srinivasan et al. | |
| 2009/0105636 A1 | 4/2009 | Hayter et al. | |
| 2009/0106652 A1 | 4/2009 | Stluka et al. | |
| 2009/0112532 A1 | 4/2009 | Foslien et al. | |
| 2009/0187265 A1 | 7/2009 | Wan et al. | |
| 2009/0319070 A1 | 12/2009 | Morningred et al. | |
| 2010/0006037 A1 | 1/2010 | Salzman | |
| 2010/0010845 A1 | 1/2010 | Kuhn et al. | |
| 2010/0023162 A1 | 1/2010 | Gresak et al. | |
| 2010/0036181 A1 | 2/2010 | Diebold et al. | |
| 2010/0042455 A1 | 2/2010 | Liu et al. | |
| 2010/0220830 A1 | 9/2010 | Shimazu | |
| 2010/0301273 A1 | 12/2010 | Blasiak et al. | |
| 2011/0093133 A1* | 4/2011 | Turney | F25B 1/053 700/300 |
| 2011/0131017 A1 | 6/2011 | Cheng et al. | |
| 2011/0135034 A1 | 6/2011 | Mujica et al. | |
| 2011/0169665 A1 | 7/2011 | Palanisamy et al. | |
| 2011/0178622 A1 | 7/2011 | Tuszynski | |
| 2011/0224830 A1 | 9/2011 | Jia et al. | |
| 2011/0258568 A1 | 10/2011 | Pandurangan et al. | |
| 2012/0229469 A1 | 9/2012 | Lizotte | |
| 2013/0124714 A1 | 5/2013 | Bednar | |
| 2013/0282146 A1 | 10/2013 | Lu | |
| 2013/0297367 A1 | 11/2013 | Baramov | |
| 2014/0012511 A1 | 1/2014 | Mensinger et al. | |
| 2014/0303754 A1 | 10/2014 | Nixon et al. | |
| 2015/0081399 A1 | 3/2015 | Mitchell et al. | |
| 2015/0148924 A1 | 5/2015 | Di Cairano et al. | |
| 2015/0186243 A1 | 7/2015 | Ratay et al. | |
| 2015/0234779 A1* | 8/2015 | Raghunathan | G06F 17/11 708/446 |
| 2015/0371418 A1 | 12/2015 | Laycock et al. | |
| 2016/0018796 A1 | 1/2016 | Lu | |
| 2016/0018797 A1 | 1/2016 | Lu | |
| 2018/0285800 A1* | 10/2018 | Wenzel | G06Q 10/06313 |
| 2018/0356773 A1 | 12/2018 | Trenchard et al. | |
| 2018/0356790 A1 | 12/2018 | Vartak et al. | |
| 2018/0356806 A1 | 12/2018 | Dave et al. | |
| 2018/0356811 A1 | 12/2018 | Trenchard et al. | |

OTHER PUBLICATIONS

Utzel, "Philosophy of ITER Alarm System Management", Sep. 4, 2017, ITER, pp. 12 (Year: 2017).*

International Search Report and Written Opinion dated Aug. 17, 2015 in connection with International Patent Application No. PCT/US2015/032537, 11 pages.

Datadog, Inc., "Anomaly Detection", Dec. 8, 2016, 9 pages.

International Preliminary Report on Patentability dated Feb. 14, 2012 in connection with International Patent Application No. PCT/US2010/044116, 5 pages.

Arzén et al., "Integrated Control and Scheduling", Technical Reports TFRT-7586, Department of Automatic Control, Lund Institute of Technology, Aug. 1999, 52 pages.

Bodington, "Chapter 13: Financial Justification—Why Should We Integrate Planning, Scheduling, and Control?", Planning, Scheduling, and Control Integration in the Process Industries, 1995, pp. 303-305.

Grossmann et al., "Research Challenges in Process Systems Engineering", AIChE Journal, vol. 46, No. 9, Sep. 2000, 7 pages.

Harjunkoski et al., "Integration of scheduling and control—Theory or practice?", Computers and Chemical Engineering, vol. 33, No. 12, Dec. 2009, pp. 1909-1918.

Nath et al., "Dynamic Real-time Optimization and Process Control of Twin Olefins Plants at DEA Wesseling Refinery"; 13th Annual Ethylene Producers Conference, AIChE 2001 Annual Meeting, Apr. 2001, 26 pages.

Qin et al., "A survey of industrial model predictive control technology", Control Engineering Practice, vol. 11, No. 7, Jul. 2003, pp. 733-764.

Qin et al., "An Overview of Industrial Model Predictive Control Technology", AIChE Symposium Series, vol. 93, No. 316, Jan. 1997, 31 pages.

Reynolds et al., "Advanced Process Control & On-Line Optimization: Global Market Research Study; Market Analysis and Forecast through 2017", ARC Advisory Group, 2012, 196 pages.

Shobrys et al., "Planning scheduling and control systems: why cannot they work together", Computers & Chemical Engineering, vol. 26, No. 2, Feb. 2002, pp. 149-160.

International Search Report and Written Opinion dated Feb. 11, 2016 in connection with International Patent Application No. PCT/US2015/056868, 9 pages.

Bemporad et al., "Model Predictive Control Based on Linear Programming—The Explicit Solution", IEEE Transactions on Automatic Control, vol. 47, No. 12., Dec. 2002, pp. 1974-1985.

* cited by examiner

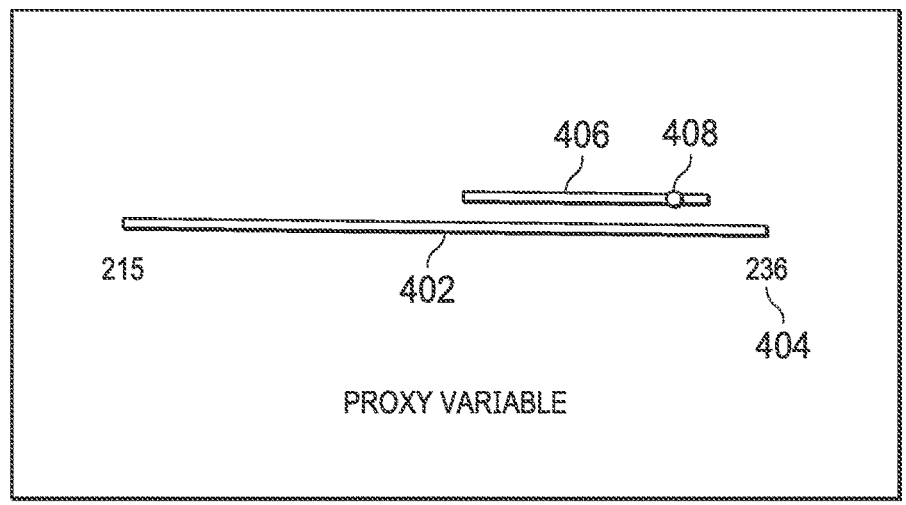
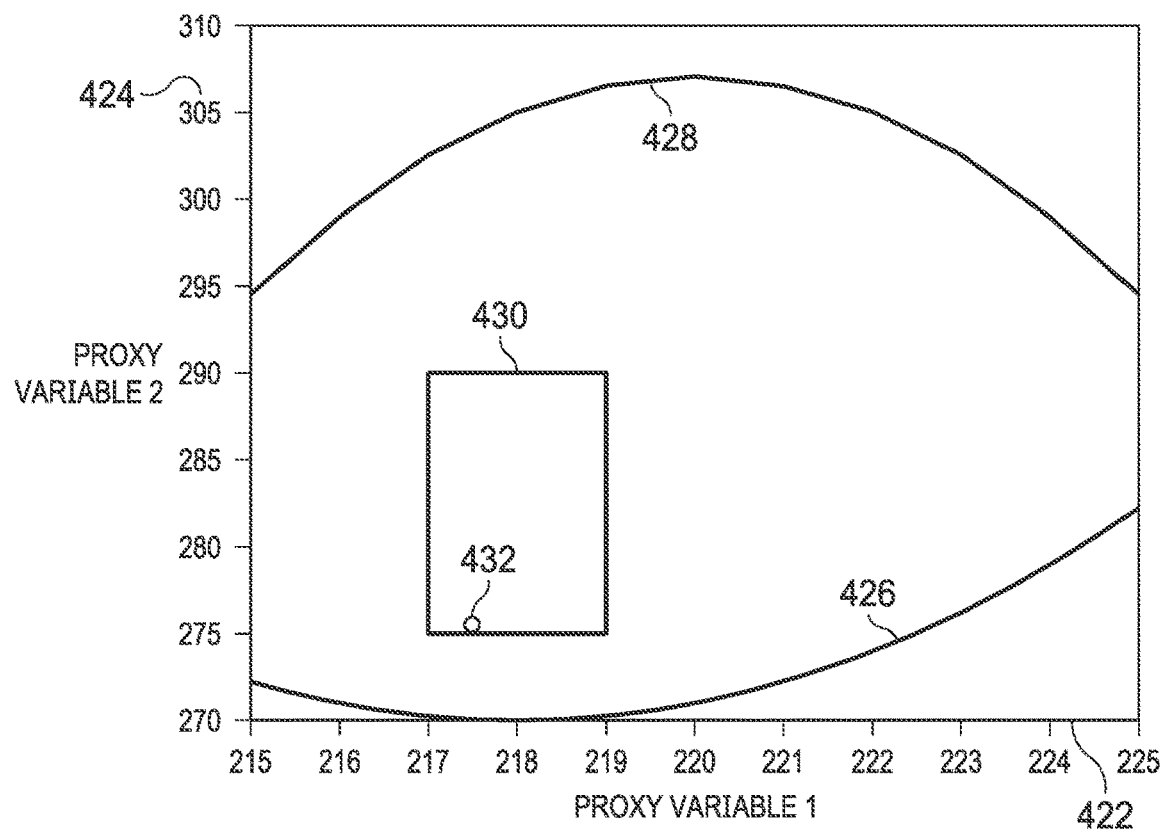

APPARATUS AND METHOD FOR USING ADVANCED PROCESS CONTROL TO DEFINE REAL-TIME OR NEAR REAL-TIME OPERATING ENVELOPE

CROSS-REFERENCE TO RELATED APPLICATION AND PRIORITY CLAIM

This application claims priority under 35 U.S.C. § 119(e) to U.S. Provisional Patent Application No. 62/575,984 filed on Oct. 23, 2017. This provisional application is hereby incorporated by reference in its entirety.

TECHNICAL FIELD

This disclosure relates generally to industrial process control and automation systems. More specifically, this disclosure relates to an apparatus and method for using advanced process control to define a real-time or near real-time operating envelope.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators.

Process control and automation systems often use a large number of process variables when controlling industrial processes. An "operating envelope" can be defined for one or more process variables, where the operating envelope identifies the range(s) of acceptable values for the associated process variable(s). Often times, the operating envelope is defined by acceptable high and low limits for each of the associated process variables.

Understanding the operating envelope is often important for effectively managing an industrial process or a portion thereof. For example, during a plant-wide upset or other event, managers, engineers, and operators often need to know how far the operating point of an industrial process can be shifted while still maintaining appropriate quality and safety limits within the overall system. Often times, these decisions are based on intuition or past experience, so they may not be valid for current operations.

SUMMARY

This disclosure provides an apparatus and method for using advanced process control to define a real-time or near real-time operating envelope In a first embodiment, a method includes identifying one or more proxy limit variables to be used to define an operating envelope associated with an industrial process controller. The industrial process controller is associated with a number of process variables including the one or more proxy limit variables. The method also includes maximizing and minimizing at least one of the one or more proxy limit variables. The method further includes presenting maximum and minimum values of the at least one of the one or more proxy limit variables as the operating envelope in a graphical user interface to at least one user.

In a second embodiment, an apparatus includes at least one processor configured to identify one or more proxy limit variables to be used to define an operating envelope associated with an industrial process controller. The industrial process controller is associated with a number of process variables including the one or more proxy limit variables. The at least one processor is also configured to maximize and minimize at least one of the one or more proxy limit variables. The at least one processor is further configured to initiate presentation of maximum and minimum values of the at least one of the one or more proxy limit variables as the operating envelope in a graphical user interface to at least one user.

In a third embodiment, a non-transitory computer readable medium contains instructions that when executed cause at least one processing device to identify one or more proxy limit variables to be used to define an operating envelope associated with an industrial process controller. The industrial process controller is associated with a number of process variables including the one or more proxy limit variables. The medium also contains instructions that when executed cause the at least one processing device to maximize and minimize at least one of the one or more proxy limit variables. The medium further contains instructions that when executed cause the at least one processing device to initiate presentation of maximum and minimum values of the at least one of the one or more proxy limit variables as the operating envelope in a graphical user interface to at least one user.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4A through 4C illustrate example operating envelopes determined using advanced process control and proxy limit variables according to this disclosure;

DETAILED DESCRIPTION

Figure 1:
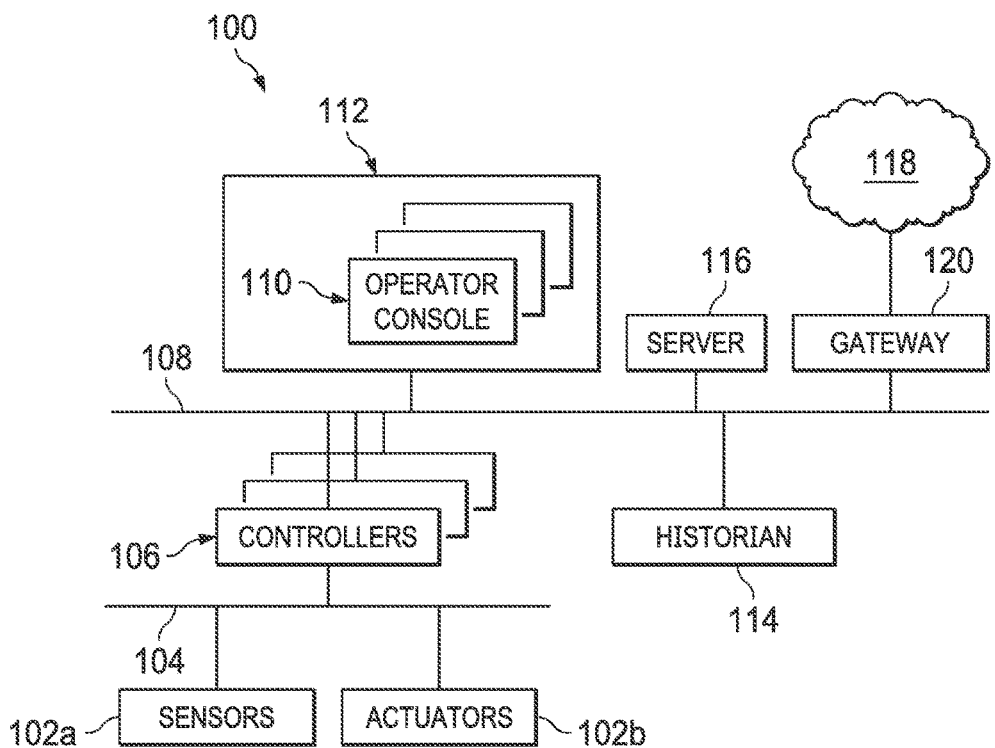
FIG. 1 illustrates an example industrial process control and automation system according to this disclosure.

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, process control and automation systems often use a large number of process variables when controlling industrial processes, and an "operating envelope" can be defined for one or more of these process variables. The operating envelope identifies the range(s) of acceptable values for the associated process variable(s) and is often defined by acceptable high and low limits for each of the associated process variables. While understanding the operating envelope is often important for effectively managing an industrial process or a portion thereof, actually quantifying the operating envelope can be difficult. For example, the bounds of an operating envelope may be determined when equipment (such as a process unit) is first commissioned, but the operating envelope typically shifts over time. This can be due to a number of factors, such as changes to the materials used in the equipment, impurities collecting in the equipment, and mechanical wear of the equipment. In a relatively short amount of time, the operating envelope for the equipment can often only be estimated based on current plant operations.

When model predictive control (MPC) or other advanced predictive control (APC) techniques are commissioned in a process control and automation system, software is typically configured and used to actively manage primary operating constraints of an industrial process using a combination of certain process variables (referred to as "control handles"). The software is designed to mitigate or prevent excursions of process variables outside of the operating envelope while pursuing the most beneficial operating point within the operating envelope. The most "beneficial" operating point could be defined in various ways, such as the most economical operating point (which is often defined in terms such as maximized production, minimized material or energy usage, or other factors). By design, APC controllers understand key real-time operating limitations of the industrial process and continuously adjust the control handles to achieve peak performance. However, APC controllers do not quantify the whole operating space and are instead focused on optimizing the current operating point.

This disclosure describes techniques for defining the operating envelope of an industrial process or a portion thereof in real-time or near real-time using proxy limit variables. Proxy limits have been used as a way to abstract and project operating constraints of process equipment (such as process units) onto one or more key performance metrics. The key performance metrics can be chosen to integrate the equipment into a plant-wide planning and scheduling tool. As such, the proxy limits are used to limit the optimization of an overall plant by injecting real-world constraints into the optimization. Proxy limits used in this way are described in U.S. Patent Publication No. 2016/0018797 (which is hereby incorporated by reference in its entirety).

While proxy limits are useful in that context, proxy limits have a few shortcomings when used to identify operating envelopes for industrial processes. First, the key performance metrics are often chosen to integrate with a plant-wide optimizer (the planning and scheduling tool) and may not represent the metrics that are important to equipment managers, engineers, operators, or other personnel who use operating envelopes. Second, while proxy limits can be used to abstract equipment operating limits, the number of proxy limits involved could be relatively large since they are used for integration with the planning and scheduling tool. Realistically, a manager, engineer, operator, or other personnel might wish to limit an operating envelope to one, two, or three dimensions, such as unit throughput and conversion. Third, techniques for calculating proxy limits can be chosen for speed and efficient integration. However, when used with an operating envelope, clarity of the display of the operating envelope often supersedes speed and efficiency.

In accordance with this disclosure, one or more metrics are chosen to define an operating envelope for equipment associated with an industrial process or a portion thereof. By design, these metrics are part of an APC controller associated with the equipment and are said to represent "proxy limit variables." Using optimization software such as in a cloud-based environment, the proxy limit variables can be maximized and minimized under a variety of conditions in order to determine the ultimate operating limits (the operating envelope) for the equipment. This operating envelope is then presented to one or more managers, engineers, operators, or other personnel, such as in the form of one or more limited-dimension dashboard figures (like one-, two-, or three-dimensional figures). The number of dimensions in the dashboard figure can be based on the number of proxy limit variables used to define the operating envelope.

In this way, operating envelopes for industrial processes can be identified and presented to suitable personnel in real-time or near real-time. This can be useful in various ways. For example, understanding process equipment's ultimate operating limits in real-time or near real-time can be highly beneficial to a manager, engineer, operator, or other personnel, such as during major upsets or other events where the equipment is often run at an atypical operating state. The real-time or near real-time operating envelope can also be used to convey key tradeoffs between important operating variables to all personnel running the envelope.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102*a* and one or more actuators 102*b*. The sensors 102*a* and actuators 102*b* represent components in a process system that may perform any of a wide variety of functions. For example, the sensors 102*a* could measure a wide variety of characteristics in the process system, such as flow, pressure, or temperature. Also, the actuators 102*b* could alter a wide variety of characteristics in the process system, such as valve openings. Each of the sensors 102*a* includes any suitable structure for measuring one or more characteristics in a process system. Each of the actuators 102*b* includes any suitable structure for operating on or affecting one or more conditions in a process system.

At least one network 104 is coupled to the sensors 102*a* and actuators 102*b*. The network 104 facilitates interaction with the sensors 102*a* and actuators 102*b*. For example, the network 104 could transport measurement data from the sensors 102*a* and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HIGHWAY ADDRESSABLE REMOTE TRANSDUCER or "HART" network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing MPC or other APC control techniques. As a particular example, each controller 106 could represent a computing device running a real-time operating system, a WINDOWS operating system, or other operating system.

At least one of the controllers 106 shown in FIG. 1 could represent a model-based controller that operates using one or more process models. For example, each of the at least one of the controllers 106 could operate using one or more process models to determine, based on measurements from one or more sensors 102a, how to adjust one or more actuators 102b. In some embodiments, each model associates one or more manipulated or disturbance variables with one or more controlled variables. A controlled variable (CV) generally represents a process variable that can be measured or inferred and that is ideally controlled to be at or near a desired setpoint or within a desired range of values. A manipulated variable (MV) generally represents a process variable that can be adjusted in order to alter one or more controlled variables and could be referred to as a "control handle." A disturbance variable (DV) generally represents a process variable whose value can be considered but cannot be controlled. As a simple example, a flow rate of material through a pipe could represent a controlled variable, a valve opening for a valve that controls the flow rate of material could represent a manipulated variable, and an ambient temperature around the pipe or the valve could represent a disturbance variable.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here may optionally include at least one historian 114 and/or one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 represents a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

At least one component of the system 100 supports a mechanism for using advanced process control to define one or more operating envelopes for process equipment in real-time or near real-time. For example, this functionality could be implemented in an operator console 110, a server 116, or a computing cloud 118 or remote server. Each operating envelope can then be presented to one or more suitable personnel, such as on one or more displays of one or more operator consoles 110 or other fixed or mobile devices. In this way, managers, engineers, operators, or other personnel are able to view operating envelopes for process equipment in real-time or near real-time, which is beneficial for the reasons discussed above. Additional details regarding this functionality are provided below.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. As a particular example, the historian 114 may be implemented in the computing cloud 118. Further, particular functions have been described as being performed by particular components of the system 100. This is for illustration only. In general, control and automation systems are highly configurable and can be configured in any suitable manner according to particular needs. In addition, FIG. 1 illustrates one example operational environment where advanced process control can be used to define an operating envelope in real-time or near real-time. This functionality can be used in any other suitable system.

Figure 2:
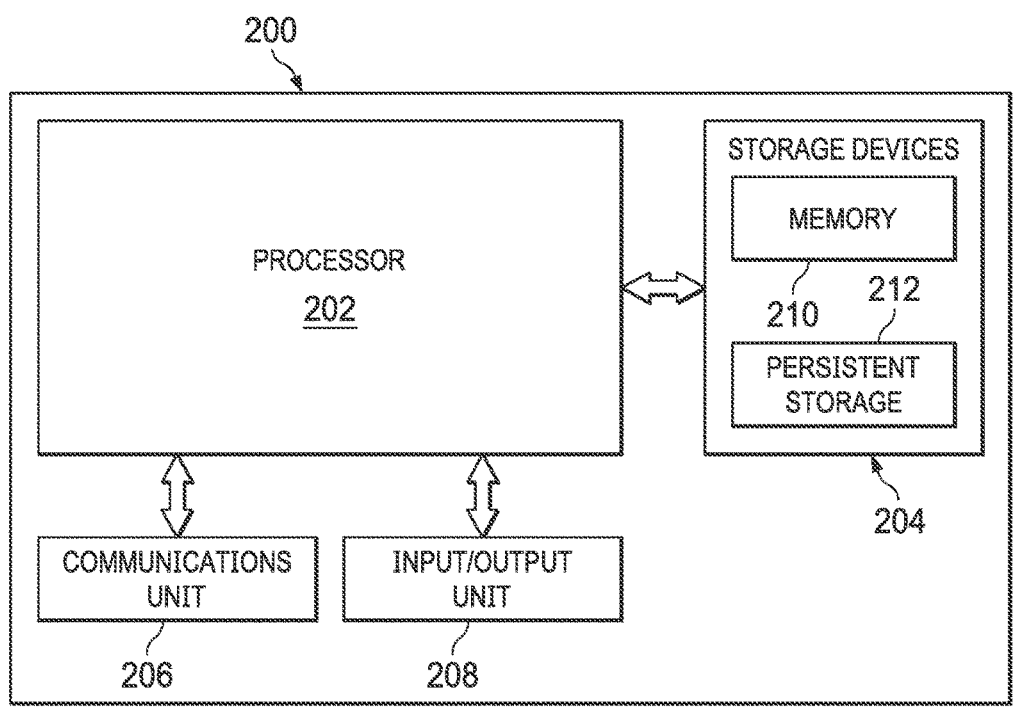
FIG. 2 illustrates an example device for using advanced process control to define a real-time or near real-time operating envelope according to this disclosure.

FIG. 2 illustrates an example device 200 for using advanced process control to define a real-time or near real-time operating envelope according to this disclosure. The device 200 could, for example, represent an operator console 110, server 116, remove server, or device used in the computing cloud 118 described above with respect to FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could use advanced process control to define an operating envelope in real-time or near real-time as described in this patent document. Each processor 202 represents any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that local I/O need not be supported by the device 200, such as when interactions with the device 200 occur over a network (via the communications unit 206).

Although FIG. 2 illustrates one example of a device 200 for using advanced process control to define a real-time or near real-time operating envelope, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
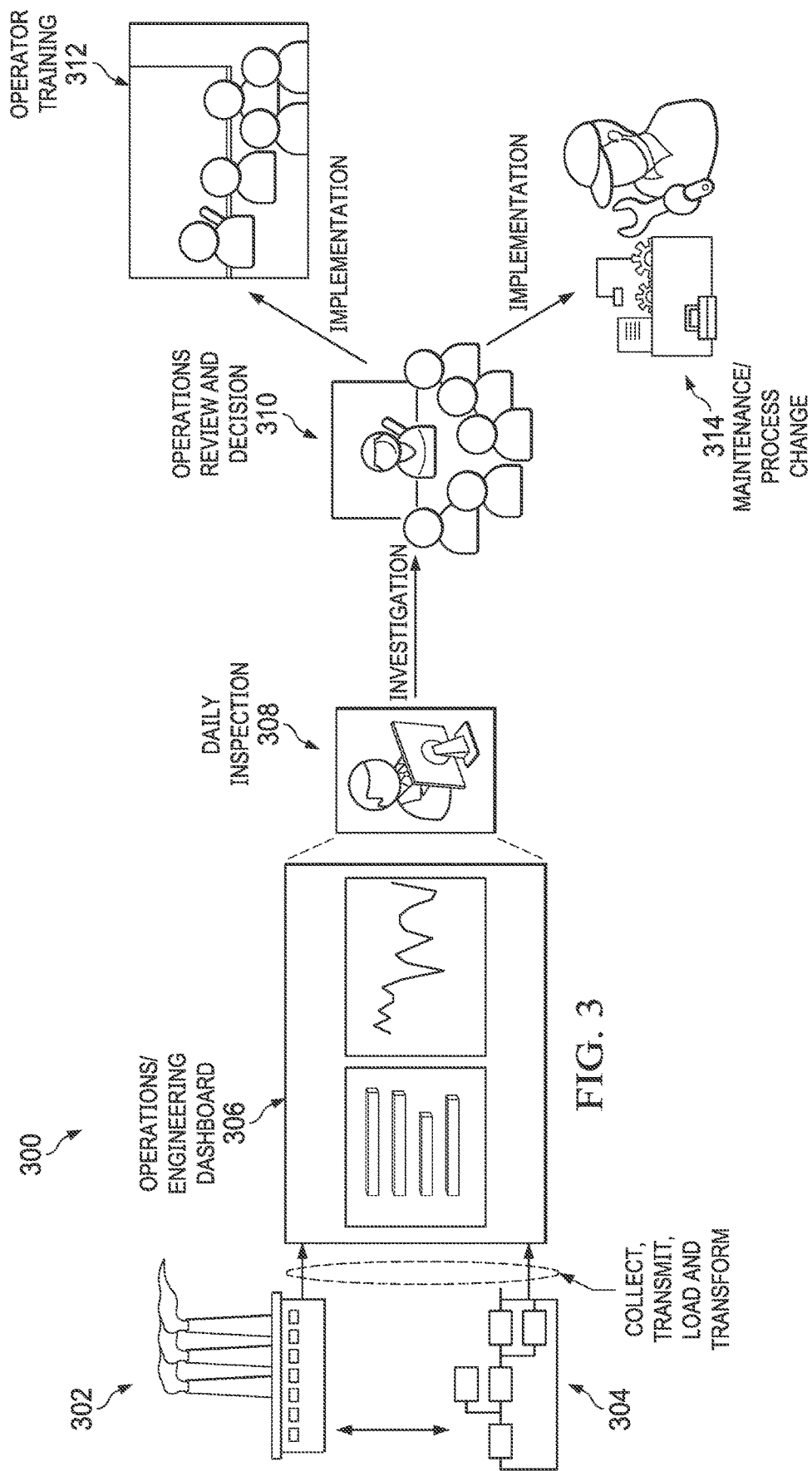
FIG. 3 illustrates an example process for using advanced process control to define a real-time or near real-time operating envelope according to this disclosure.

FIG. 3 illustrates an example process 300 for using advanced process control to define a real-time or near real-time operating envelope according to this disclosure. In this example, the process 300 supports "APC as a Service" (AaaS), meaning APC tuning or other functions related to the use of APC controllers can be provided remotely (such as "in the cloud"). As part of this service, advanced process control can be used to define one or more real-time or near real-time operating envelopes for one or more industrial processes. Note, however, that this type of service used in conjunction with the identification of a real-time or near real-time operating envelope is for illustration only. The identification of a real-time or near real-time operating envelope can occur locally to an industrial process or remote from the industrial process in any other suitable manner. For ease of explanation, the process 300 is described as involving the system 100 of FIG. 1, although the process 300 could be used with any other suitable control and automation system.

As shown in FIG. 3, data associated with at least one industrial process 302 and data associated with at least one industrial process control and automation system 304 (which could represent the system 100) can be collected. The data associated with the industrial process 302 could represent any suitable data, such as the values of various controlled, manipulated, and optionally disturbance variables. The data associated with the control and automation system 304 could also represent any suitable data, such as an identification of process variable constraints or other data used, generated, or collected by APC controllers or other components of the system 304.

The data could be collected by any suitable device or system, such as an operator console 110, server 116, remote server, or device used in the computing cloud 118 described above with respect to FIG. 1. Also, while shown as being collected from the industrial process 302 and the system 304, the data could be obtained from any suitable source(s). For instance, the system 304 could collect data about the industrial process 302 and provide all of the data for analysis, or the data about the industrial process 302 and the system 304 could be stored in at least one historian or other database and retrieved for analysis. Note that a secure data transfer mechanism could be used to protect the data being collected and transmitted, and the data could be collected and transmitted in real-time, near real-time, or non-real-time depending on the implementation.

However the data is obtained, the data can be stored and analyzed periodically, continuously, or at other times in order to determine key process variable metrics and controller performance metrics. For example, the data can be analyzed as described below in order to identify metrics used to define the operating envelope of an industrial process or a portion thereof in real-time or near real-time using proxy limit variables. The metrics can be chosen to define the operating envelope for equipment in the industrial process and by design are part of an APC controller associated with the equipment. The metrics can be maximized and minimized under various conditions in order to determine the operating envelope for the equipment.

In some embodiments, the analysis of the collected data involves the use of a "digital twin" associated with an APC controller. In other words, a replica of the functionality of the controller or a portion thereof (such as its optimizer) can be used during the analysis, such as to perform "what if" analyses to determine how the controller could have operated differently. This allows the analysis to determine what an improved or optimal operating envelope for the controller might be. The digital twin could also be referred to as a "shadow" controller.

The metrics defining the operating envelope can be presented to one or more managers, engineers, operators, or other personnel, such as in the form of one or more low-dimensional dashboards 306. In some embodiments, the identified operating envelope can be presented to different users in different role-specific views, such as within different cloud-based dashboards 306 used by the users. The dashboards 306 can be viewed by one or more users to, among other things, identify one or more operating envelopes for one or more industrial processes. For example, the dashboards 306 could be used during daily inspections 308 to determine whether an industrial process is operating acceptably or to modify an industrial process. Also, review and decision personnel 310 could use the dashboards 306 to more closely investigate what might be causing process instability or other issues in the industrial process(es). Once likely causes are identified, corrective action could be taken, such as scheduling operator training 312 or implementing changes 314 in the industrial process 302 or the control and automation system 304. Of course, the dashboards 306 or the results of the analyses could be used in any other suitable manner.

One example goal here could be to improve the collaboration between operations management, process engineering, and control engineering staff in order to maintain and improve equipment performance. Among other things, this approach can help to improve collaboration between the operations management, process engineering, and control engineering personnel in order to maintain and improve the performance of the industrial process 302 while leveraging the APC controller(s) 106 to achieve the best effect. Note, however, that the approaches described in this patent document could be used in any other suitable manner.

Although FIG. 3 illustrates one example of a process 300 for using advanced process control to define a real-time or near real-time operating envelope, various changes may be made to FIG. 3. For example, the data used in the analyses could be collected from any suitable source(s) and in any suitable manner. Also, the results of the analyses could be used in any suitable manner.

Figure 4C:
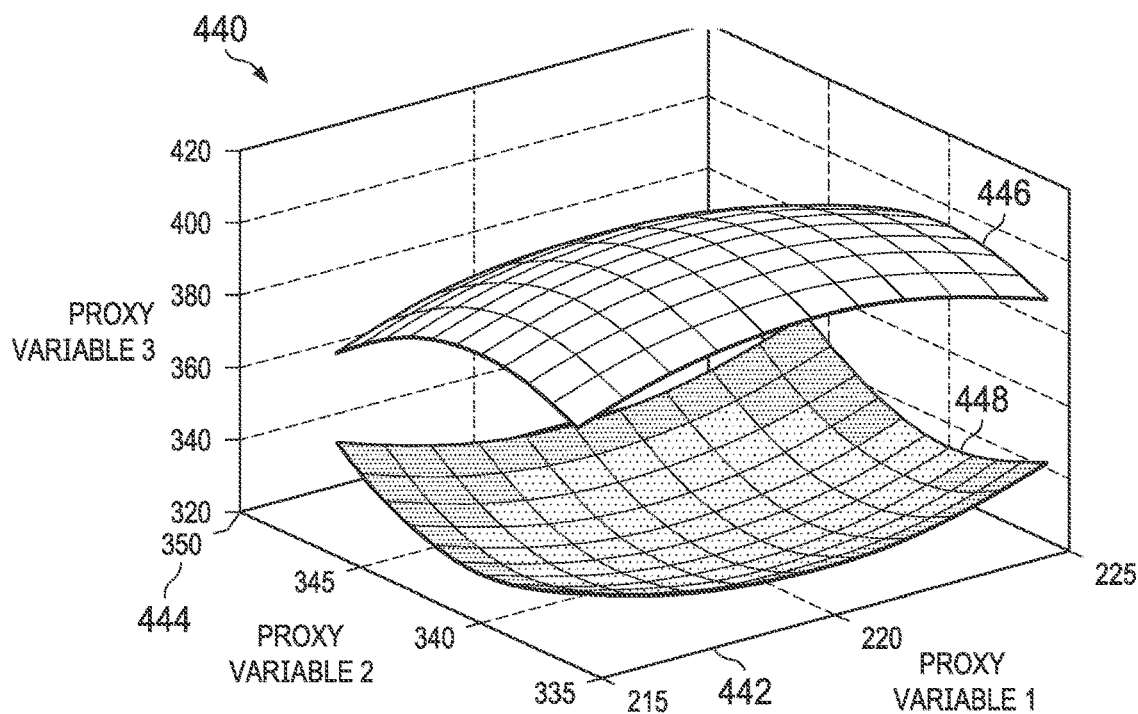

FIGS. 4A through 4C illustrate example operating envelopes determined using advanced process and proxy limits according to this disclosure. These operating envelopes could, for example, be presented as part of a cloud-based or other dashboard 306 that is presented to one or more users. For ease of explanation, the operating envelopes shown in FIGS. 4A through 4C may be described as being generated by the device 200 of FIG. 2 operating as part of the process 300 shown in FIG. 3 along with the system 100 of FIG. 1. However, operating envelopes could be determined by any suitable device, using any suitable process, and in any suitable system.

As shown in FIG. 4A, a graph 400 presents a one-dimensional operating envelope, meaning the operating envelope is associated with a single proxy limit variable. As described below, a proxy limit variable is associated with a manipulated or controlled variable used by an APC controller 106. In FIG. 4A, a line 402 represents the operating envelope for the single proxy limit variable's value, meaning the line 402 defines the operating region over which valid and safe operation occurs. This operating envelope can be defined based on the underlying constraint limitation built into the APC controller 106. Labels 404 identify maximum and minimum values of the proxy limit variable for this operating envelope. The proxy limit variable's value can fall anywhere along the line 402 between the lower and upper values and remain within the operating envelope.

A line 406 can be overlaid onto or adjacent the operating envelope defined by the line 402. The line 406 identifies the current operating range for the proxy limit variable. The line 406 therefore identifies the range in which an APC controller 106 is attempting to maintain the proxy limit variable, and this range is often set by an operator or other personnel. In the graph 400, the current operating range represented by the line 406 is completely inside the operating region represented by the line 402, but this need not be the case. If the current operating range is larger than or at least partially outside the allowed operating region defined by the operating envelope, the emphasis is on the APC controller 106 to maintain safe operation. At least one marker 408 can be positioned in the graph 400 to identify the current value and/or the steady-state value of the proxy limit variable. In some cases, two markers 408 can be used, one for the current value of the proxy limit variable and one for the steady-state value of the proxy limit variable.

As shown in FIG. 4B, a graph 420 presents a two-dimensional operating envelope, meaning the operating envelope is associated with two proxy limit variables. In FIG. 4B, two axes 422 represent ranges of values for the two proxy limit variables, and labels 424 identify maximum and minimum values of the proxy limit variables along the axes 422. Two lines 426 and 428 represent the operating envelope for the two proxy limit variables' values, meaning the area between the lines 426 and 428 defines the operating region over which valid and safe operation occurs. The proxy limit variables' values can fall anywhere within this area and remain within the operating envelope.

A polygon (such as a rectangle) or other shape 430 identifies the current operating range for the two proxy limit variables. The shape 430 therefore identifies the ranges in which an APC controller 106 is attempting to maintain the two proxy limit variables, and these ranges are often set by an operator or other personnel. Again, in the graph 420, the current operating range represented by the shape 430 is completely inside the operating region represented by the lines 426 and 428, but this need not be the case. At least one marker 432 can be positioned in the graph 420 to identify the current values and/or the steady-state values of the proxy limit variables. In some cases, two markers 432 can be used, one for the current values of the proxy limit variables and one for the steady-state values of the proxy limit variables.

As shown in FIG. 4C, a graph 440 presents a three-dimensional operating envelope, meaning the operating envelope is associated with three proxy limit variables. In FIG. 4C, three axes 442 represent ranges of values for the three proxy limit variables, and labels 444 identify maximum and minimum values of the proxy limit variables along the axes 442. Two surfaces 446 and 448 represent the operating envelope for the three proxy limit variables' values, meaning the volume between the surfaces 446 and 448 defines the operating region over which valid and safe operation occurs. The proxy limit variables' values can fall anywhere within this volume and remain within the operating envelope. Although not shown here, a three-dimensional polytope (such as a cube or rectangular prism) could identify the current operating range for the three proxy limit variables, which could be set by an operator or other personnel. Also, although not shown here, at least one marker can be positioned in the graph 440 to identify the current values and/or the steady-state values of the three proxy limit variables. In some cases, two markers can be used, one for the current values of the proxy limit variables and one for the steady-state values of the proxy limit variables.

Managers, engineers, operators, and other personnel could use any of these graphs 400, 420, 440 to quickly locate one or more proxy limit variables' values within a one-, two-, or three-dimensional operating envelope. For example, personnel could view the operating envelope presented in a cloud-based or other dashboard 306 in order to identify (i) where one or more proxy limit variables are currently located with respect to the associated operating envelope and/or (ii) where the one or more proxy limit variables are likely to settle at their steady-state values with respect to the associated operating envelope. This may allow the personnel to make more informed decisions, such as how to adjust an industrial process. This can also be accomplished in real-time or near real-time since the operating envelopes can be identified in real-time or near real-time.

It should be noted that significant computational power/time may be needed to determine proxy limit variables, especially for multi-dimensional proxy limit variables. Thus, it will often not be feasible to execute software or other logic to determine the proxy limit variables and generate the dashboards or other graphics with suitable operating envelope graphs on the same device used for real-time control (such as on the APC controllers 106 themselves). The determination of the proxy limit variables and the generation of the dashboards or other graphics could occur on other devices, such as an operator console 110, server 116, remote server, or device used in the computing cloud 118. In some embodiments, this is accomplished by using a shadow or digital twin of an APC controller 106 as described above, although other approaches could also be used.

Although FIGS. 4A through 4C illustrate examples of operating envelopes determined using advanced process and proxy limit variables, various changes may be made to FIGS. 4A through 4C. For example, the specific contents and arrangements of the graphs shown in FIGS. 4A through 4C are for illustration only. Any other suitable graphs or other graphics can be generated to represent an operating envelope for one or more proxy limit variables.

Figure 5:
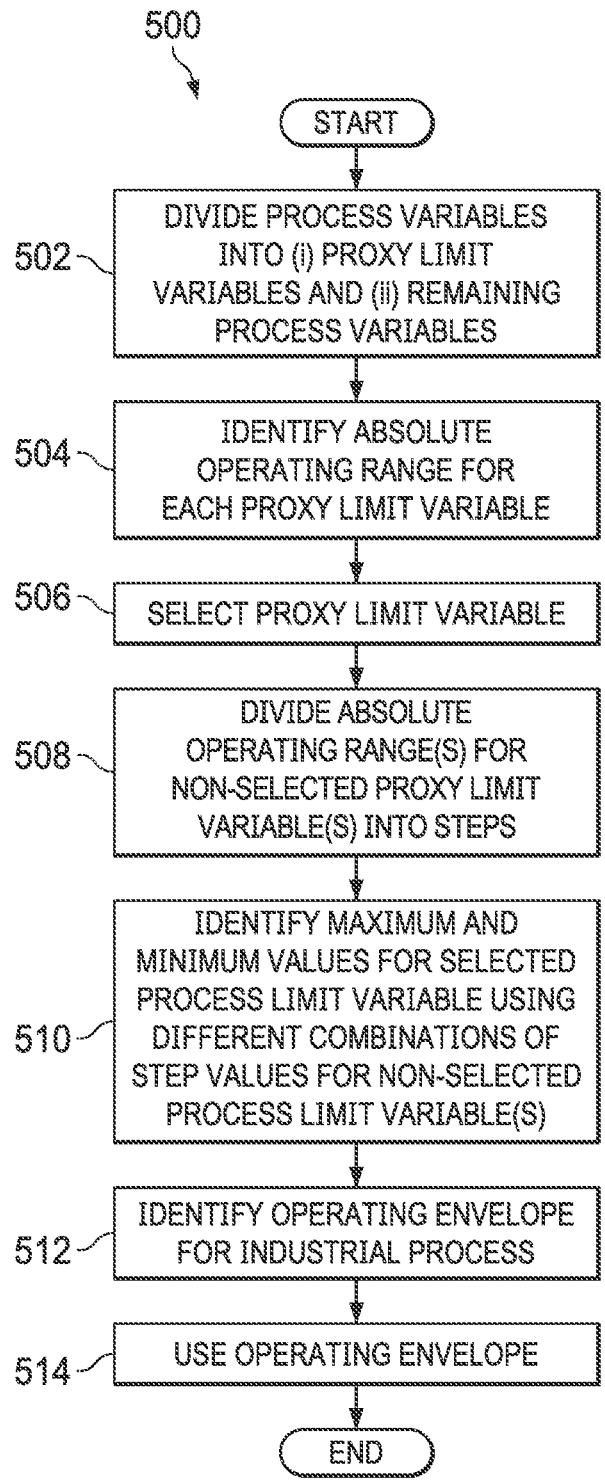
FIG. 5 illustrates an example method for using advanced process control to define a real-time or near real-time operating envelope according to this disclosure.

FIG. 5 illustrates an example method 500 for using advanced process control to define a real-time or near real-time operating envelope according to this disclosure. For ease of explanation, the method 500 shown in FIG. 5 may be described as being performed by the device 200 of FIG. 2 operating as part of the process 300 shown in FIG. 3 along with the system 100 of FIG. 1. However, the method 500 could be performed by any suitable device, using any suitable process, and in any suitable system.

As shown in FIG. 5, process variables associated with an industrial process or a portion thereof are divided into (i) one or more proxy limit variables and (ii) one or more remaining process variables at step 502. This could include, for example, personnel associated with an APC controller or an industrial process identifying one or more process variables that would be useful to consider as part of an operating envelope graphic. The one or more identified process variables can be used as the proxy limit variable(s). This could also include using all non-selected process variables as the remaining process variables. This can occur for both controlled and manipulated variables associated with the industrial process. This can also be done manually or in an automated manner.

An absolute operating range for each proxy limit variable is identified at step 504. This could include, for example, the processor 202 of the device 200 identifying the maximum and minimum values that each proxy limit variable could obtain based on the optimization performed by an APC controller 106. During these calculations, each proxy limit variable can be minimized and maximized while any other proxy limit variables are kept at their current operating point or within their safety bounds. This can be repeated for each proxy limit variable. The one or more absolute operating ranges for the one or more proxy limit variables identify the maximum range (the largest size) for the overall operating envelope to be determined.

Assuming there are multiple proxy limit variables being used, one of the proxy limit variables is selected at step 506. This could include, for example, the processor 202 of the device 200 selecting one of the proxy limit variables previously identified. Any suitable technique could be used to randomly, semi-randomly, or predictably select a proxy limit variable.

The absolute operating range for each non-selected proxy limit variable is divided into steps or bins at step 508. This could include, for example, the processor 202 of the device 200 dividing the absolute operating range for each non-selected proxy limit variable into evenly-spaced steps. In some embodiments, the absolute operating range for each non-selected proxy limit variable is divided into steps, while the absolute operating range for the selected proxy limit variable is not divided into steps (although this need not be the case). Also, in some embodiments, the steps in a single absolute operating range could be the same size, while the steps in different absolute operating ranges may or may not be the same size.

Maximum and minimum values for the selected proxy limit variable are identified using different combinations of step values for the non-selected proxy limit variable(s) at step 510. This could include, for example, the processor 202 of the device 200 identifying the maximum and minimum values that the selected proxy limit variable could obtain for each possible combination of step values for the non-selected proxy limit variable(s). Based on the way that the step values were determined above, the step values for the non-selected proxy limit variable(s) are kept within the absolute operating range(s) of those non-selected proxy limit variable(s). Keeping the non-selected proxy limit variables within their respective absolute operating ranges helps to keep the non-selected proxy limit variables within health, safety, or other boundaries (but they are not operational constraints on how the APC controller can modify those other proxy limit variables). Also, using different combinations of step values for the non-selected proxy limit variable(s) while maximizing and minimizing the selected proxy limit variable helps to identify the trade-off interplay between different proxy limit variables. In some embodiments, every combination of step values for the non-selected proxy limit variable(s) could be considered when maximizing and minimizing the selected proxy limit variable. However, this need not be the case.

Overall, steps 506-510 operate to find a suitable operating range for each of the proxy limit variables. This is accomplished by testing the various combinations of step values for the non-selected proxy limit variable(s) and maximizing and minimizing the selected proxy limit variable, which effectively identifies the suitable operating ranges for all proxy limit variables. Although not necessarily required, steps 506-510 could be repeated using each proxy limit variable as the selected proxy limit variable in different iterations of the steps 506-510. It should be noted that a "combination" of step values could include one or multiple step values. When there are two proxy limit variables, the different combinations could represent different individual step values for one of the proxy limit variables (the single non-selected proxy limit variable). When there are three proxy limit variables, the different combinations could represent different pairs of step values for two of the proxy limit variables (the two non-selected proxy limit variables).

The operating envelope for the industrial process is identified at step 512. This could include, for example, the processor 202 of the device 200 using one, two, three, or more operating ranges for one, two, three, or more proxy limit variables to define one or more surfaces of the operating envelope. As noted above, the operating envelope could be expressed in a limited number of dimensions (such as between one and three dimensions) depending on the number of proxy limit variables used.

The operating envelope is used in some manner at step 514. This could include, for example, the processor 202 of the device 200 generating at least one dashboard 306 for at least one user, where each dashboard 306 includes a graph (such as a graph 400, 420, 440) identifying the operating envelope. The graph could also optionally identify the current operating range for each proxy limit variable as defined by an operator, a current value of each proxy limit variable, and/or a steady-state value of each proxy limit variable. The operating envelope could be used in other ways, as well. For instance, the operating envelope could be provided to an APC controller 106 for use in determining control actions.

Although FIG. 5 illustrates one example of a method 500 for using advanced process control to define a real-time or near real-time operating envelope, various changes may be made to FIG. 5. For example, while shown as a series of steps, various steps in FIG. 5 could overlap, occur in parallel, occur in a different order, or occur any number of times. Also, if there is only a single proxy limit variable selected, steps 506-510 may be omitted.

Figure 7:
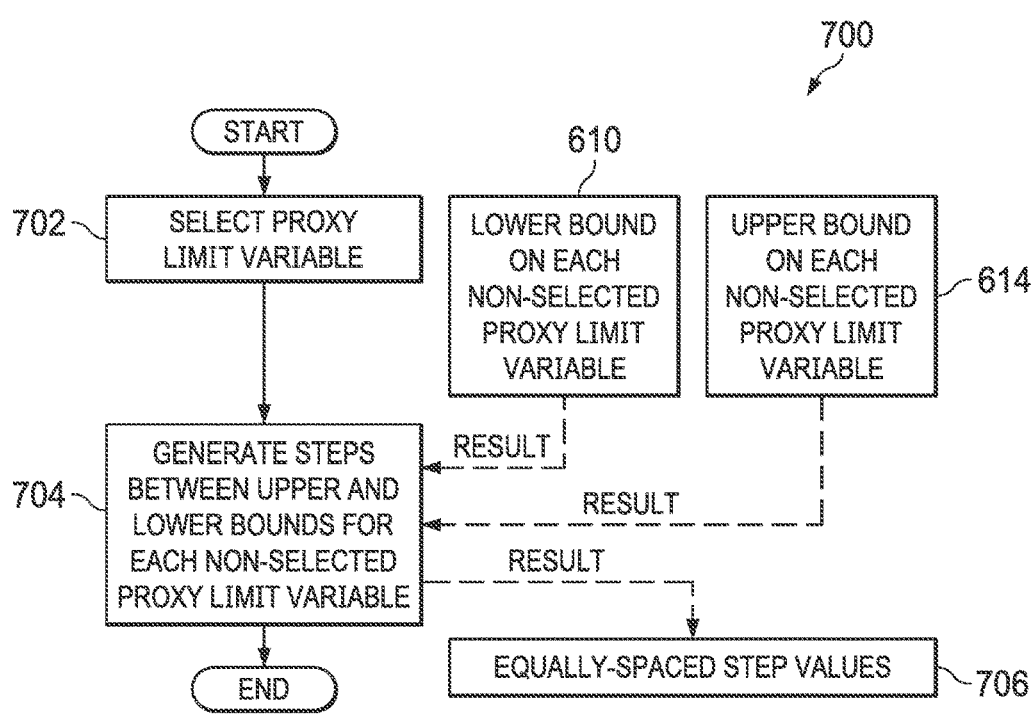
FIG. 7 illustrates an example method for generating equally-spaced step values for proxy limit variables in order to define a real-time or near real-time operating envelope according to this disclosure.
Figure 6:
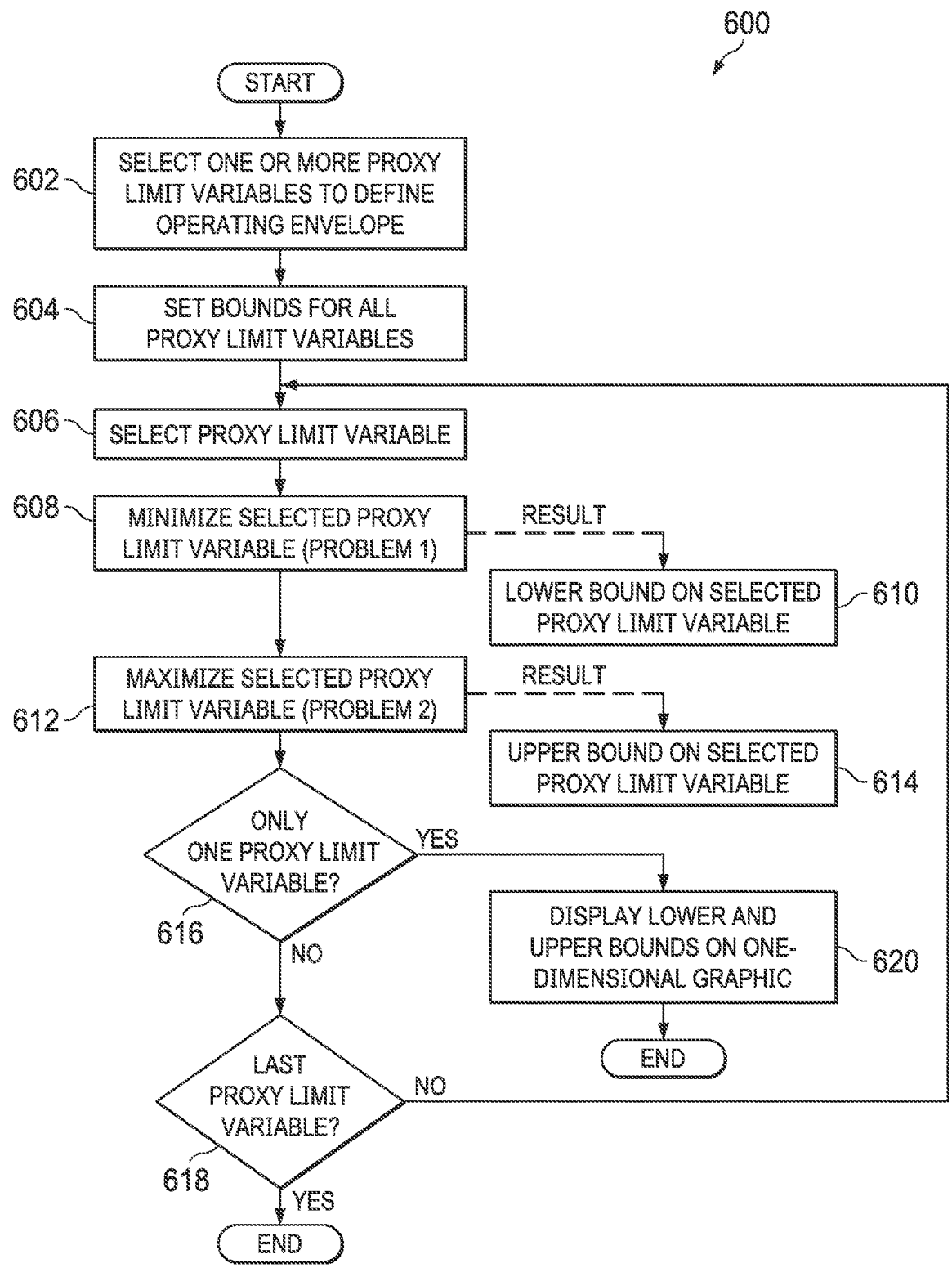
FIG. 6 illustrates an example method for initially processing absolute bounds for proxy limit variables in order to define a real-time or near real-time operating envelope according to this disclosure.
Figure 8:
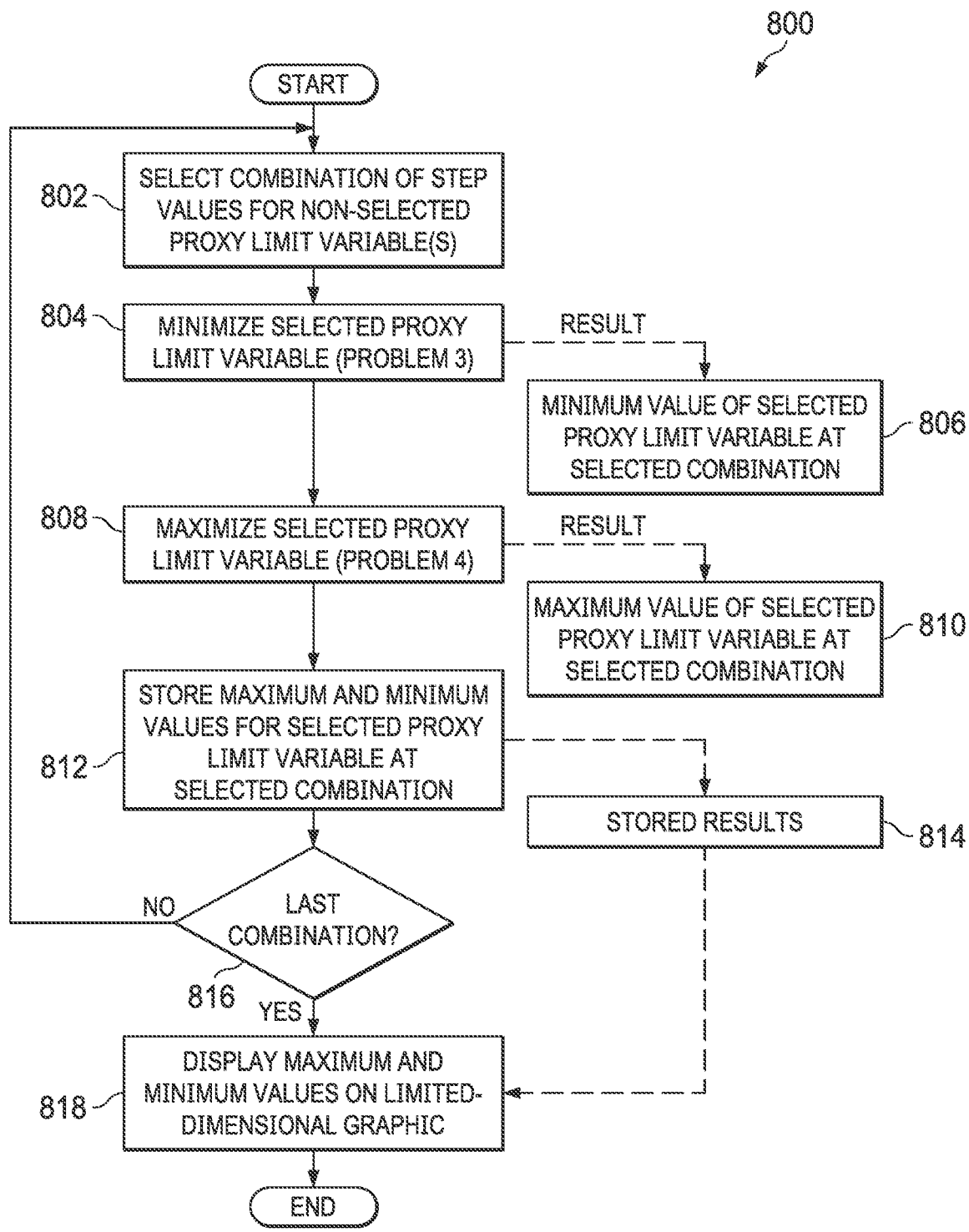
FIG. 8 illustrates an example method for calculating proxy limit variable surfaces at step intervals in order to define a real-time or near real-time operating envelope according to this disclosure.

FIGS. 6 through 8 illustrate example implementations of different steps that could occur in a specific embodiment of the method 500 shown in FIG. 5. Note, however, that other implementations of the method 500 could be used. Also, for ease of explanation, the methods shown in FIGS. 6 through 8 may be described as being performed by the device 200 of FIG. 2 operating as part of the process 300 shown in FIG. 3 along with the system 100 of FIG. 1. However, the methods shown in FIGS. 6 through 8 could be performed by any suitable device, using any suitable process, and in any suitable system.

Prior to discussing the methods shown in FIGS. 6 through 8, the following should be noted. In some embodiments, an APC controller (such as a controller 106) can operate by solving the following problem in order to find a steady-state optimum for a collection of controlled and manipulated variables:

$$\min_u (u^T H u + g u) \quad (1)$$

subject to:

$$G_{in} u + \text{bias} \leq b_{in} \quad (2)$$

$$G_{eq} u + \text{bias} = b_{eq} \quad (3)$$

$$u_L \leq u \leq u_H \quad (4)$$

Here, u represents the control handles (manipulated variables), $u_L$ and $u_H$ represent the bounds on u, Gu+bias represents the operating constraints (controlled variables) divided into inequality constraints (range limits) and equality constraints (setpoints), and $u^T H u + g u$ represents an objective function defining the optimality criterion for the industrial process or a portion thereof.

FIG. 6 illustrates an example method 600 for initially processing absolute bounds for proxy limit variables in order to define a real-time or near real-time operating envelope according to this disclosure. More specifically, the method 600 can be used to take a set of one or more proxy limit variables and individually minimize and maximize each proxy limit variable while any other proxy limit variables are kept at their current operating point or within their safety bounds. The method 600 could, for example, represent a specific implementation of steps 502, 504, 512, and 514 in the method 500 of FIG. 5.

As shown in FIG. 6, one or more proxy limit variables are selected to define an operating envelope at step 602. This could include, for example, dividing the control handles u into two sets $u_p$ and $u_{\bar{p}}$, where the first set $u_p$ includes one or more proxy limit manipulated variables and the second set $u_{\bar{p}}$ includes all remaining control handles. In a similar fashion, this could include defining one or more proxy limit variables for controlled variables. In some embodiments, a limited number of proxy limit variables can be selected, such as one, two, or three proxy limit variables. In general, a proxy limit variable $p_i$ can be defined as:

$$p_i = c_i^T u \quad (5)$$

where:

$$c_i^T = [0, 0, \ldots 0, 1, 0, \ldots, 0] \text{ for } i\text{th MV proxy variable} \quad (6)$$

$$c_i^T = [0, 0, \ldots 0, 1, 0, \ldots, 0] * G \text{ for } i\text{th CV proxy variable} \quad (7)$$

Bounds for each proxy limit variable are set at step 604. This could include, for example, setting the absolute maximum and minimum values for each proxy limit variable at the safety limits for that proxy limit variable. The safety limits could be based on limits placed on equipment by a manufacturer, vendor, plant operator, or other party for health, safety, reliability, or other concerns.

One of the one or more proxy limit variables is selected at step 606. The selected proxy limit variable can be denoted p*, and any remaining proxy limit variables can collectively be denoted p. An absolute operating range for the selected proxy limit variable is then determined. This includes minimizing the selected proxy limit variable at step 608 to identify a lower bound 610 of the selected proxy limit variable. This also includes maximizing the selected proxy limit variable at step 612 to identify an upper bound 614 of the selected proxy limit variable.

In some embodiments, the minimum and maximum values for the selected proxy limit variable can be determined as follows. Starting from the APC steady-state problem, the optimality problem can be revised to solve the following two problems. Problem 1 is defined as:

$$\min_{u_{\bar{p}}, u_p} (p^*) \quad (8)$$

subject to:

$$G_{in} u + \text{bias} \leq b_{in} \quad (9)$$

$$G_{eq} u + \text{bias} = b_{eq} \quad (10)$$

$$u_L \leq u_p \leq u_H \quad (11)$$

$$u_L \leq u_{\bar{p}} \leq u_H \quad (12)$$

Problem 2 is defined as:

$$\min_{u_P, u_p}(-p^*) \tag{13}$$

subject to:

$$G_{in}u + \text{bias} \leq b_{in} \tag{14}$$

$$G_{eq}u + \text{bias} = b_{eq} \tag{15}$$

$$u_L \leq u_P \leq u_H \tag{16}$$

$$u_L \leq u_P \leq u_H \tag{17}$$

Problem 1 can be used during step 608 to minimize the selected proxy limit variable and identify the lower bound 610. Problem 2 can be used during step 612 to maximize the selected proxy limit variable and identify the upper bound 614.

A determination is made whether there is only one proxy limit variable at step 616. If there is not a single proxy limit variable, a determination is made whether the last proxy limit variable has been selected and processed at step 618. If not, the process returns to step 606 to select and process the next proxy limit variable. If there is a single proxy limit variable, the process proceeds to display the bounds of the single proxy limit variable at step 620. This could include, for example, generating a one-dimensional graphic (such as the graph 400) identifying the upper and lower bounds of the single proxy limit variable, such as in a one-dimensional bar chart or other graphic.

Overall, steps 606-618 in FIG. 6 operate to minimize and maximize each proxy limit variable, one at a time. This can be repeated for all proxy limit variables (assuming there is more than one). During this process, when one proxy limit variable is being maximized or minimized, the bounds on any remaining proxy limit variables can be used to protect the industrial process from violating health, safety, or other constraints. While the process shown in FIG. 6 can be used to find the absolute bounds on the one or more proxy limit variables, this process does not convey the trade-off interplay between different proxy limit variables (if there are multiple proxy limit variables). Additional processing can therefore occur as shown in FIGS. 7 and 8 if there are multiple proxy limit variables.

FIG. 7 illustrates an example method 700 for generating equally-spaced step values for proxy limit variables in order to define a real-time or near real-time operating envelope according to this disclosure. More specifically, the method 700 of FIG. 7 can be used to divide one or more of the absolute operating ranges identified using the method 600 into a series of steps for one or more of the proxy limit variables. The method 700 could, for example, represent a specific implementation of steps 506 and 508 in the method 500 of FIG. 5.

As shown in FIG. 7, one of the proxy limit variables is selected at step 702. The proxy limit variable could be selected here in any suitable manner, such as automatically, based on user input, or based on some criterion or criteria associated with an industrial process. Multiple equally-spaced (or other) steps are defined between the lower and upper bounds of each non-selected proxy limit variable at step 704. This could include, for example, generating a number of equally-spaced steps 706 between the lower bound 610 and the upper bound 614 of each non-selected proxy limit variable. Any suitable number of steps 706 could be generated here. In some embodiments, ten equally-spaced values can be identified between the lower bound 610 and the upper bound 614 for each non-selected proxy limit variable. Of course, other numbers of steps could also be used, and the number of steps may or may not be consistent across different proxy limit variables.

Overall, these steps operate to identify a set of equally-spaced steps or values located between the upper and lower bounds for each proxy limit variable other than the proxy limit variable selected in step 506/702 (and steps for that proxy limit variable could also be generated). The defined steps for the non-selected proxy limit variables are then used during the process shown in FIG. 8 to identify a suitable operating envelope considering the trade-off interplay between different proxy limit variables.

FIG. 8 illustrates an example method 800 for calculating proxy limit variable surfaces at step intervals in order to define a real-time or near real-time operating envelope according to this disclosure. More specifically, the method 800 of FIG. 8 can be used to repeatedly maximize and minimize one of the proxy limit variables using different combinations of step values for other non-selected proxy limit variable(s). The method 800 could, for example, represent a specific implementation of steps 510, 512, and 514 in the method 500 of FIG. 5.

As shown in FIG. 8, a combination of step values for one or more non-selected proxy limit variables is selected at step 802 (where the selected proxy limit variable represents the proxy limit variable selected in step 506 or 702). This could include, for example, selecting a unique combination of step values for the non-selected proxy limit variable(s) during each pass through step 802. A suitable operating range for the selected proxy limit variable is then determined using this combination of step values for the other proxy limit variable(s). This includes minimizing the selected proxy limit variable at step 804 to identify a minimum value 806 of the selected proxy limit variable. This also includes maximizing the selected proxy limit variable at step 808 to identify a maximum value 810 of the selected proxy limit variable. Both occur using the selected combination of step values for the non-selected proxy limit variable(s)

In some embodiments, the minimum and maximum values for the selected proxy limit variable can be determined as follows. Problem 3 is defined as:

$$\min_{u_P, u_p}(p^*) \tag{18}$$

subject to:

$$G_{in}u + \text{bias} \leq b_{in} \tag{19}$$

$$G_{eq}u + \text{bias} = b_{eq} \tag{20}$$

$$u_L \leq u_P \leq u_H \tag{21}$$

$$p = \text{step value} \tag{22}$$

Problem 4 is defined as:

$$\min_{u_P, u_p}(-p^*) \tag{23}$$

subject to:

$$G_{in}u + \text{bias} \leq b_{in} \tag{24}$$

$$G_{eq}u + \text{bias} = b_{eq} \tag{25}$$

$$u_L \leq u_P \leq u_H \tag{26}$$

$$p = \text{step value} \tag{27}$$

Problem 3 can be used during step 804 to minimize the selected proxy limit variable and identify the minimum value 806. Problem 4 can be used during step 808 to maximize the selected proxy limit variable and identify the maximum value 810. Note that the size of the operating inequality and equality constraints in Problems 3 and 4 above may be reduced depending on how many controlled variables are defined in the proxy limit variable set p.

The minimum and maximum values obtained for the selected process variable using the selected combination of step values are stored at step 812 as a result 814. A determination is made whether the last combination of step values has been processed at step 816. As noted above, all possible combinations of step values could be selected and processed. However, in other embodiments, a limited number of step value combinations could be selected and processed, such as when only a specified number of combinations can be selected or when processing is limited by a given amount of time. If an additional combination of step values can be selected, the process returns to step 802.

Otherwise, the process proceeds to display the various minimum and maximum values at step 820. This could include, for example, generating a two- or three-dimensional graphic (such as the graph 420 or 440) identifying the minimum and maximum values 808 and 812 determined as discussed above. The results gathered from the above calculations define the operating surface or surfaces for the operating envelope.

Although FIGS. 6 through 8 illustrate example implementations of different steps that could occur in a specific embodiment of the method 500 shown in FIG. 5, various changes may be made to FIGS. 6 through 8. For example, while shown as a series of steps, various steps in each figure could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    identifying one or more proxy limit variables to be used to define in real-time or near real-time an operating envelope for a model predictive controller that is configured to control at least part of an industrial process, the model predictive controller is associated with a number of process variables including the one or more proxy limit variables;
    identifying absolute operating ranges for each of the one or more proxy limit variables;
    selecting one or more proxy limit variables;
    dividing the absolute operating ranges for non-selected proxy limit variables into a plurality of steps with each step of the plurality of steps having a step value;
    identifying maximum and minimum values of at least one of the one or more proxy limit variables by applying different combinations of the step values for the non-selected proxy limit variables to the model predictive controller to define the operating envelope of the model predictive controller; and
    presenting the maximum and minimum values of the at least one of the one or more proxy limit variables as the operating envelope in a graphical user interface to at least one user.

2. The method of claim 1, wherein:
    identifying the one or more proxy limit variables comprises identifying a single proxy limit variable;
    identifying maximum and minimum values of the at least one of the one or more proxy limit variables comprises maximizing and minimizing the single proxy limit variable using the model predictive controller; and
    presenting the maximum and minimum values comprises presenting maximum and minimum values of the single proxy limit variable in a one-dimensional representation of the operating envelope.

3. The method of claim 1, wherein:
    identifying the one or more proxy limit variables comprises identifying a single proxy limit variable; and identifying maximum and minimum values of the at least one of the one or more proxy limit variables comprises maximizing and minimizing the single proxy limit variable to identify upper and lower bounds for the single proxy limit variable, the operating envelope defined by the upper and lower bounds for the single proxy limit variable.

4. The method of claim 1, wherein:
identifying the one or more proxy limit variables comprises identifying multiple proxy limit variables;
identifying maximum and minimum values of the at least one of the one or more proxy limit variables comprises repeatedly maximizing and minimizing at least one of the proxy limit variables; and
presenting the maximum and minimum values comprises presenting maximum and minimum values of the at least one of the proxy limit variables in a multi-dimensional representation of the operating envelope.

5. The method of claim 1, wherein:
identifying the one or more proxy limit variables comprises identifying multiple proxy limit variables; and
identifying maximum and minimum values of the at least one of the one or more proxy limit variables comprises:
for each proxy limit variable, identifying upper and lower bounds for the proxy limit variable;
selecting one of the proxy limit variables such that one or more non-selected proxy limit variables remain;
for each non-selected proxy limit variable, identifying step values between the upper and lower bounds for the non-selected proxy limit variable; and
repeatedly identifying maximum and minimum values of the selected proxy limit variable using different combinations of step values for the one or more non-selected proxy limit variables, the operating envelope defined by maximum and minimum values of the selected proxy limit variable.

6. The method of claim 5, wherein, for each non-selected proxy limit variable, the step values for the non-selected proxy limit variable are evenly-spaced.

7. The method of claim 1, wherein maximizing and minimizing the at least one of the one or more proxy limit variables comprises:
setting bounds for each of the one or more proxy limit variables to associated safety limits for the proxy limit variable.

8. The method of claim 1, further comprising presenting, in the graphical user interface, at least one of:
a current operating range for each of the one or more proxy limit variables; and
at least one marker identifying at least one of: one or more current values of the one or more proxy limit variables and one or more steady-state values of the one or more proxy limit variables.

9. An apparatus comprising:
at least one processor configured to:
identify one or more proxy limit variables to be used to define in real-time or near real-time an operating envelope for a model predictive controller that is configured to control at least part of an industrial process, the model predictive controller is associated with a number of process variables including the one or more proxy limit variables;
identify absolute operating ranges for each of the one or more proxy limit variables;
select the one or more proxy limit variables;
divide the absolute operating ranges for non-selected proxy limit variables into a plurality of steps with each step of the plurality of steps having a step value;
identifying maximum and minimum values of at least one of the one or more proxy limit variables by applying different combinations of step values for the non-selected proxy limit variables to the model predictive controller to define the operating envelope of the model predictive controller; and
initiate presentation of maximum and minimum values of the at least one of the one or more proxy limit variables as the operating envelope in a graphical user interface to at least one user.

10. The apparatus of claim 9, wherein the at least one processor is configured to:
identify a single proxy limit variable;
identifying maximum and minimum values of the single proxy limit variable using the model predictive controller; and
initiate presentation of maximum and minimum values of the single proxy limit variable in a one-dimensional representation of the operating envelope.

11. The apparatus of claim 9, wherein the at least one processor is configured to:
identify a single proxy limit variable; and
identifying the maximum and minimum values of the single proxy limit variable to identify upper and lower bounds for the single proxy limit variable, the operating envelope defined by the upper and lower bounds for the single proxy limit variable.

12. The apparatus of claim 9, wherein the at least one processor is configured to:
identify multiple proxy limit variables;
repeatedly identify maximum and minimum values of at least one of the proxy limit variables; and
initiate presentation of maximum and minimum values of the at least one of the proxy limit variables in a multi-dimensional representation of the operating envelope.

13. The apparatus of claim 9, wherein the at least one processor is configured to:
identify multiple proxy limit variables; and
identify maximum and minimum values of the at least one of the one or more proxy limit variables by:
for each proxy limit variable, identifying upper and lower bounds for the proxy limit variable;
selecting one of the proxy limit variables such that one or more non-selected proxy limit variables remain;
for each non-selected proxy limit variable, identifying step values between the upper and lower bounds for the non-selected proxy limit variable; and
repeatedly identifying maximum and minimum values of the selected proxy limit variable using different combinations of step values for the one or more non-selected proxy limit variables, the operating envelope defined by maximum and minimum values of the selected proxy limit variable.

14. The apparatus of claim 9, wherein the at least one processor is further configured to initiate presentation, in the graphical user interface, of at least one of:
a current operating range for each of the one or more proxy limit variables; and
at least one marker identifying at least one of: one or more current values of the one or more proxy limit variables and one or more steady-state values of the one or more proxy limit variables.

15. A non-transitory computer readable medium containing instructions that when executed cause at least one processing device to:
- identify one or more proxy limit variables to be used to define in real-time or near real-time an operating envelope for a model predictive controller that is configured to control at least part of an industrial process, the model predictive controller is associated with a number of process variables including the one or more proxy limit variables;
- identify absolute operating ranges for each of the one or more proxy limit variables;
- select the one or more proxy limit variables;
- divide the absolute operating ranges for non-selected proxy limit variables into a plurality of steps with each step of the plurality of steps having a step value;
- identifying maximum and minimum values of at least one of the one or more proxy limit variables applying different combinations of the step values for the non-selected proxy limit variable to the model predictive controller to define the operating envelope of the model predictive controller; and
- initiate presentation of maximum and minimum values of the at least one of the one or more proxy limit variables as the operating envelope in a graphical user interface to at least one user.

16. The non-transitory computer readable medium of claim 15, wherein the instructions when executed cause the at least one processing device to:
- identify a single proxy limit variable;
- identify maximum and minimum values of the single proxy limit variable using the model predictive controller; and
- initiate presentation of maximum and minimum values of the single proxy limit variable in a one-dimensional representation of the operating envelope.

17. The non-transitory computer readable medium of claim 15, wherein the instructions when executed cause the at least one processing device to:
- identify a single proxy limit variable; and
- identify maximum and minimum values of the single proxy limit variable to identify upper and lower bounds for the single proxy limit variable, the operating envelope defined by the upper and lower bounds for the single proxy limit variable.

18. The non-transitory computer readable medium of claim 15, wherein the instructions when executed cause the at least one processing device to:
- identify multiple proxy limit variables;
- repeatedly identify maximum and minimum values of at least one of the proxy limit variables; and
- initiate presentation of maximum and minimum values of the at least one of the proxy limit variables in a multi-dimensional representation of the operating envelope.

19. The non-transitory computer readable medium of claim 15, wherein the instructions when executed cause the at least one processing device to:
- identify multiple proxy limit variables; and
- identify maximum and minimum values of the at least one of the one or more proxy limit variables by:
  - for each proxy limit variable, identifying upper and lower bounds for the proxy limit variable;
  - selecting one of the proxy limit variables such that one or more non-selected proxy limit variables remain;
  - for each non-selected proxy limit variable, identifying step values between the upper and lower bounds for the non-selected proxy limit variable; and
  - repeatedly identifying maximum and minimum values of the selected proxy limit variable using different combinations of step values for the one or more non-selected proxy limit variables, the operating envelope defined by maximum and minimum values of the selected proxy limit variable.

20. The non-transitory computer readable medium of claim 15, wherein the instructions when executed further cause the at least one processing device to initiate presentation, in the graphical user interface, of at least one of:
- a current operating range for each of the one or more proxy limit variables; and
- at least one marker identifying at least one of: one or more current values of the one or more proxy limit variables and one or more steady-state values of the one or more proxy limit variables.

* * * * *